United States Patent [19]

Taylor et al.

[11] Patent Number: 5,299,043
[45] Date of Patent: Mar. 29, 1994

[54] UNDERWATER LIQUID CRYSTAL DISPLAY APPARATUS HAVING IDENTICAL POLARIZERS AND REFLECTOR IN BOTH THE MATTING AND LIQUID CRYSTAL CELL

[75] Inventors: George W. Taylor, Princeton, N.J.; Andrew Magion, Yardley, Pa.

[73] Assignee: Merlin Industries, Trenton, N.J.

[21] Appl. No.: 21,200

[22] Filed: Feb. 23, 1993

[51] Int. Cl.⁵ .............................................. G02F 1/13
[52] U.S. Cl. ....................................... 359/83; 359/63; 359/70; 359/89
[58] Field of Search ....................... 359/36, 62, 63, 70, 359/83, 82, 89; 345/38, 50

[56] References Cited

U.S. PATENT DOCUMENTS

| 4,202,607 | 5/1980 | Washizuka et al. | 359/83 |
| 4,403,830 | 9/1983 | Gerstner | 359/70 |
| 4,408,836 | 10/1983 | Kikuno | 359/82 |
| 4,412,214 | 10/1983 | Tanaka et al. | 359/87 |
| 4,824,212 | 4/1989 | Taniguchi | 359/55 |

FOREIGN PATENT DOCUMENTS

| 0395794 | 11/1990 | European Pat. Off. | 359/62 |
| 0278827 | 12/1986 | Japan | 359/63 |
| 0222224 | 9/1989 | Japan | 359/83 |
| 0302222 | 12/1989 | Japan | 359/62 |

Primary Examiner—William L. Sikes
Assistant Examiner—Tai V. Duong
Attorney, Agent, or Firm—Michael Y. Epstein

[57] ABSTRACT

A display apparatus for underwater use comprises a hermetically sealed enclosed including a liquid crystal display device. The device comprises a liquid crystal cell disposed between layers of light polarizers and a light reflector. The combination of cell, polarizers and reflector displays either bright images on a dark background or the reverse. To make the edges of the cell substantially invisible, for improving readability of the display, the liquid crystal cell is surround by a matting comprising the identical layers of light polarizers and reflector used in combination with the liquid crystal cell. A common matting can be used with a mosaic of cells to create the appearance of a single, large area cell, or with several cells to display independent images.

5 Claims, 2 Drawing Sheets

UNDERWATER LIQUID CRYSTAL DISPLAY APPARATUS HAVING IDENTICAL POLARIZERS AND REFLECTOR IN BOTH THE MATTING AND LIQUID CRYSTAL CELL

This invention relates to display apparatus including liquid crystal display devices for displaying information under water, e.g., timing information for swimmers in a pool.

For timing swimming speed, it is common to provide large clocks by the edges of pools for observation by the swimmers. The visibility of such clocks, particularly as a swimmer approaches an end of a pool, it generally poor. Often, the swimmer must alter his swimming posture to see the clock, thus disrupting his rhythm and affecting his speed. It is thus desirable to place the clock directly within the pool, and generally in the normal line of sight of the swimmer.

Also, the clock displays can display other information as well, e.g., the number of laps swum, the temperature of the pool, and the like.

Liquid crystal display devices are particularly well suited for use in underwater display apparatus. They are low power, low voltage devices, thereby simplifying water sealing problems, and they are highly visible over a wide range of ambient light conditions.

Obviously, relatively large area displays are most desirable. Further, to maximize the size of the displayed elements, e.g., numerals, it is desirable that the numerals take-up the maximum possible space on the face of the display. A problem with this, it has been discovered, is that readability of the displays is somewhat adversely affected when elements of the display are too close to an edge of the display device. For example, when the vertical bar of the number one extends close to the upper edge of the display, a shadow cast by the display upper edge sometimes appears as a horizontal bar, thereby making it somewhat difficult, at least at a quick glance, to determine whether the number being displayed is the number seven or the intended number one. This problem is made worse when the display is being viewed through turbulent water, such as that created when a swimmer nears the end of the pool.

Increasing the size of the display obviously solves the problem. However, because the cost of liquid crystal displays is a direct function of the area thereof, an increase in a linear dimension of the display causes a cost increase proportional to the square of the linear increase. Adequately large displays, therefore, can be undesirably expensive.

An object of the invention is to maximize the readability of liquid crystal displays, particularly for underwater use, thereby allowing the use of smaller and less costly liquid crystal display devices than would otherwise be necessary.

SUMMARY OF THE INVENTION

A display apparatus for underwater use comprises a hermetically sealed enclosure having a transparent window, and a liquid crystal device disposed within the enclosure. The liquid crystal device comprises a liquid crystal cell of the type that rotates polarized light, e.g., of the twisted nematic type, disposed between a front light polarizer and a read light polarizer backed by a light reflector. This combination of liquid crystal device elements, as known, is effective to selectively absorb or reflect incident light to create a display of images, either bright image elements on a dark background, or the reverse. To improve the readability of the images, the edges of the liquid crystal cell are rendered substantially invisible by being caused to visually blend into a background substantially identical in appearance to the background of the displayed images. This is accomplished by surrounding the liquid crystal cell with a matting comprising light polarizers and light reflectors of the same type used in connection with the liquid crystal cell itself.

The various parts of the liquid crystal cells and the display matting are not drawn to scale.

DESCRIPTION OF PREFERRED EMBODIMENTS OF THE INVENTION

Figure 1:
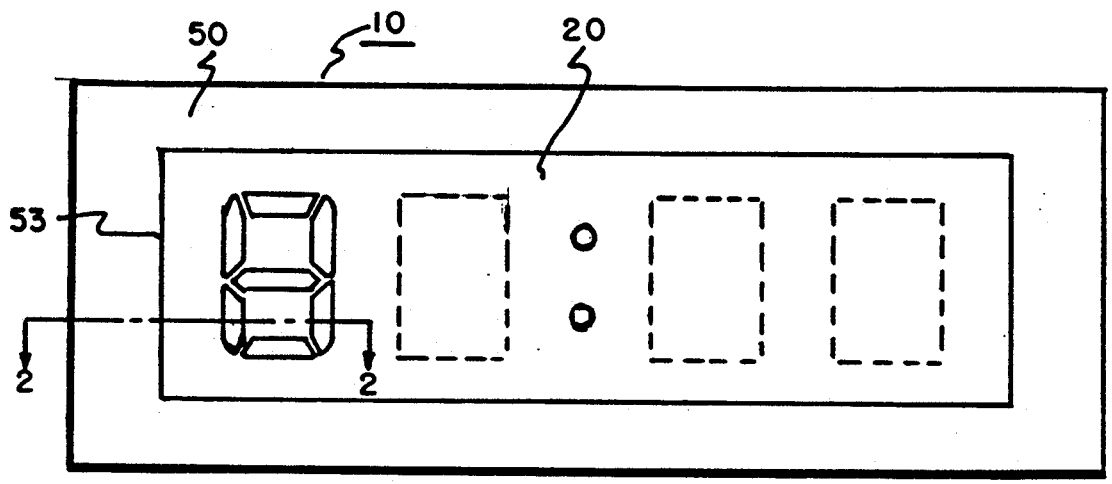
FIG. 1 is a front view of a liquid crystal display device in accordance with the invention.
Figure 2:
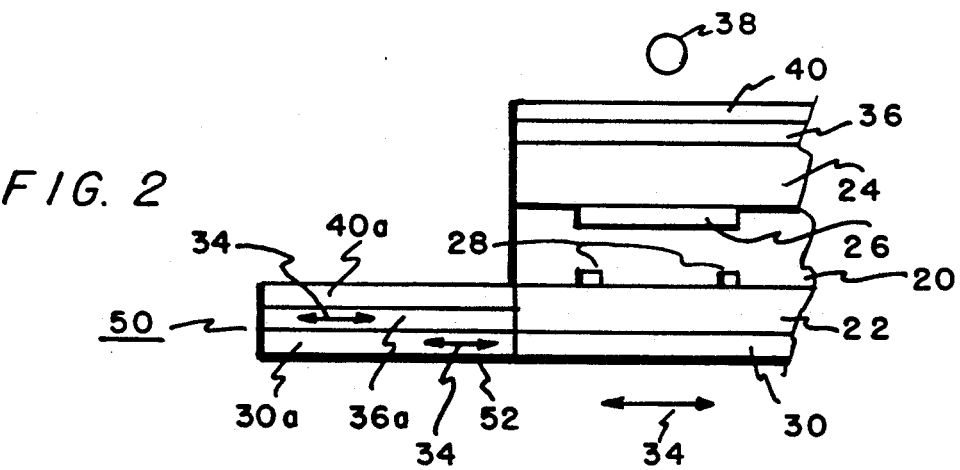
FIG. 2 is a cross-section of the display shown in FIG. 1 along line 2—2 thereof.

With reference to FIGS. 1 and 2, one embodiment of a liquid crystal display device 10 particularly suitable for use in an underwater display apparatus is shown. The display device 10 includes a liquid crystal cell 20 capable of displaying changing numerals indicative of the passage of seconds and minutes (up to sixty minutes and thereafter starting from zero). Liquid crystal cells for display purposes are now quite common, and the cells 10 used herein can be selected from commercially available cells. Also, means for electrically driving liquid crystal cells to display time and other information are similarly well known, hence are not illustrated or described herein.

The liquid cell 20 comprises (FIG. 2) a pair of transparent front 22 and rear 24 glass plates between which is sealed a liquid crystal material. Each plate carries, on an inside surface thereof, one or more transparent electrodes formed from a layer of conductive material, e.g., tin oxide. For example, the electrode 26 on the rear plate 24 can comprise a continuous layer of conductive material, whereas the conductive material layer on the front plate 22 is patterned into a number of numeral defining electrodes 28. By selectively applying a voltage difference between the rear electrode 26 and various ones of the electrodes 28 on the front plate 22, the portions of the liquid crystal material between the front and rear plates across which the potential difference is applied undergo a physical change, i.e., a re-orientation of the alignment of the liquid crystal molecules. This changes the light transmitting characteristics of the liquid crystal material for polarized light. In this embodiment of the invention, the voltage selected and altered liquid crystal portions allow polarized light to pass therethrough without rotation of the axis of polarization of the light.

Conversely, the axis of polarized light passing through portions of the liquid crystal material not exposed to a voltage difference is rotated 90 degrees.

Disposed in front of the front plate 22 of the cell 20 is a transparent light polarizer 30 of known type, e.g., a plastic polarizer available from the Kodak Corporation. In this embodiment, the front polarizer 30 is effective to polarize incident ambient light along first axes 34 parallel to the plane of the drawing, as indicated by the arrow 34. That is, ambient light incident on the front polarizer is polarized and only light polarized along the axes 34 passes through the front polarizer. Disposed behind the rear plate 24 of the cell 20 is a rear light polarizer 36 which is effective to transmit therethrough only light which is polarized along second axes 38 perpendicular to the first axes 34, as indicated by the arrow head 38. Light incident on the rear polarizer 36 which is not polarized along the second axes 38 is absorbed by the rear polarizer and not transmitted therethrough. Preferably, the two light polarizers 30 and 36 are of the identical material, but rotated 90 degrees with respect to one another.

The polarizers 30 and 36 and the light reflector 40 are bonded in place, as by gluing with a transparent glue.

Disposed behind the rear polarizer 36 is a light reflector 40, e.g., of a smooth layer of aluminum on a plastic backing, the reflective aluminum layer facing towards the cell 20.

In use of the cell 20 to display an image, a potential difference is applied between the rear electrode 26 and selected ones of the front electrodes 28. As mentioned, the liquid crystal material portions disposed between the electrode 26 and selected ones of the electrodes 28 undergo a change in the orientation of the liquid crystal molecules with the result that polarized light passes therethrough without rotation. Thus, light transmitted through the front polarizer 30, which light has been polarized along first axes 34 by the polarizer 30, passes through the liquid crystal cell to the rear polarizer 36 without rotation. This light is then absorbed by the rear polarizer and not reflected back to a viewer of the display device. The voltage selected portions of the liquid crystal cell thus appear dark to a viewer.

Conversely, polarized light passing from the first polarizer through portions of the liquid crystal cell material which are not exposed to a voltage difference is rotated 90 degrees to become polarized along the second axes 38. Such polarized light is transmitted through the rear polarizer 36 and onto the rear light reflector 40 which reflects the light back through the rear polarizer 36 and back through the liquid crystal cell 20. The reflected light retraces its original path through the cell and through the non-selected portions of the liquid crystal material. The reflected light is thus again rotated 90 degrees back to the first axes 34, hence passes through the front polarizer 30. This reflected light is visible to a viewer of the display.

Thus, by applying a voltage difference between selected patterns of electrodes on the front plate and the electrode on the rear plate of the liquid crystal cell, dark images on a bright background are created.

By using front and rear polarizers having parallel axes of light polarization, bright images on a dark background are displayed.

Liquid crystal display cells of the type described, e.g., of the twisted nematic type, are known.

In accordance with this invention, a background matting 50 is provided for improving the visibility of the displayed images, thereby allowing the use of smaller cells than would otherwise be necessary.

As shown in FIG. 2, the matting 50 comprises a laminate of three layers 30a, 36a and 40a, with the front surface 52 of the front layer 30a being co-planer with the front surface of the front polarizer 30 of the liquid crystal cell 20. That is, as shown in FIG. 1, the matting 50 is formed with an aperture 53 therethrough into which the liquid crystal cell 20 snugly fits.

Figure 3:
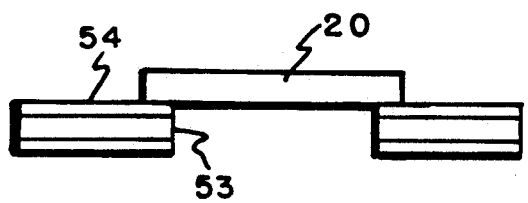
FIG. 3 is a cross-section taken through an opening through a matting showing, in an embodiment different from that shown in FIGS. 1 and 2, the disposition of a liquid crystal cell relative to the matting.

In another embodiment, shown in FIG. 3, the liquid crystal cell 20 is larger in its lateral dimensions than those of the matting aperture 53, and the liquid crystal cell 20 abuts against the rear surface 54 of the matting. The four side edges of the cell are masked from view by the side edges of the matting aperture.

The visually preferred embodiment is the one illustrated in FIG. 1 because, as hereinafter described, the side edges of the liquid crystal cell substantially invisibly blend into the background provided by the matting. An advantage of the partially hidden liquid crystal cell embodiment shown in FIG. 3 is that, because the cell need not fit snugly within the matting aperture, larger manufacturing tolerances can be accepted. A disadvantage of this latter embodiment is that the matting aperture edges can cast a small shadow, thereby slightly disrupting the desired edgeless appearance of the liquid crystal cell.

The matting 50 comprises the identical light polarizers and light reflector used in combination with the liquid crystal cell, with the exception that the two light polarizers, in this embodiment of the invention, have parallel polarization axes. Thus, the front layer 30a of the matting 50 is a light polarizer identical to the front polarizer 30 of the cell 20 and is effective to polarize incident ambient light along the first axes 34.

The second layer 36a of the matting 50 comprises a light polarizer identical to the rear polarizer 36 of the cell 20, but physically rotated 90 degrees with respect to the cell polarizer 36 so as to be effective to transmit only light which is also polarized along the first axes 34.

The third layer 40a of the matting 52 comprises a forward facing light reflector identical to the light reflector 40 used within the cell.

The three layers 30a, 36a and 40a of the matting 50 are bonded together by a transparent glue. The combination of parallel axes polarizers in the matting results in the reflection of light incident on the matting which thus has a bright appearance substantially identical to the bright background provided by the liquid crystal cell for dark images displayed thereby.

Because the matting has substantially the identical appearance as the image background displayed by the liquid crystal cell, the edges of the cell become substantially invisible. This improves the overall appearance of the display. Also, because the edges are not visible, they do not present visible lines or shadows distracting from the legibility of the displayed images. Thus, the image elements can be made to extend as closely as possible to the edges of the cells to maximize the size of the displayed images, and smaller cells than would otherwise be required can be used.

The use of the identical light polarizers and light reflector in both the matting and the liquid crystal cell is essential to create the identical background appearance. The reason for this is that the polarizers and reflectors are not perfect and, if different polarizers and/or light reflectors are used, different optical effects will result. Also, the main factors affecting the optical effects are the light polarization, light rotation and light reflection. Because the matting performs these functions identically to the polarizers and reflectors used with the liquid crystal cell, the visual appearance of the matting, even without a liquid crystal cell, is substantially identical to that of the image background within the cell.

Thus, while, as above-explained, the matting 50 enables the use of smaller cells, the cost of the matting, comprising only the quite inexpensive polarizers and reflector, is much less than the larger size cells needed for comparable legibility in the absence of the matting.

In the foregoing described embodiment, a single liquid crystal cell, including addressable, segmented electrodes, is used to display a number of images, e.g., numerals.

Figure 4:
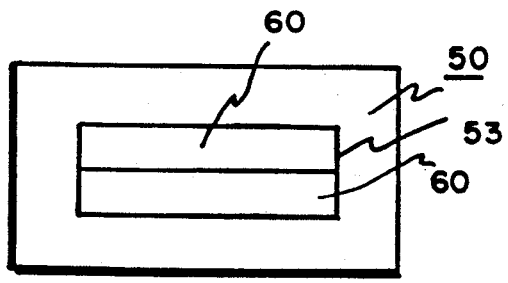
FIGS. 4–6 are front views of other embodiments of the invention.
Figure 5:
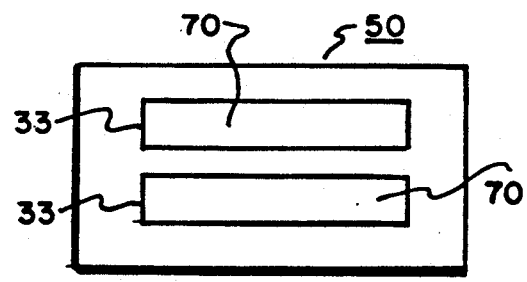

In another embodiment of the invention, shown in FIG. 4, two separate liquid crystal cells 60 are provided immediately adjacent to one another within a single aperture 53 through the matting. Alternatively, as shown in FIG. 5, two spaced apart cells 70 can be provided, each cell fitting within a separate one of two apertures 53 through the matting. Each cell 70 is individually addressable, hence two separate images can be simultaneously displayed, e.g., time and water temperature or the like.

Figure 6:
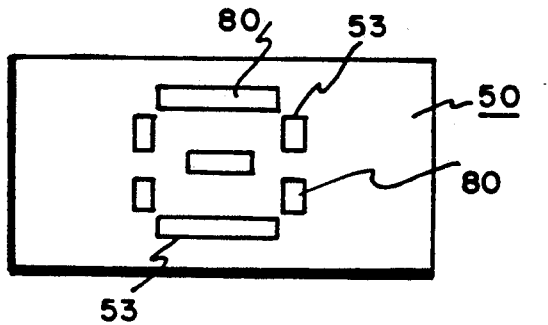

In another embodiment, shown in FIG. 6, a plurality of spaced apart liquid crystal cells 80 are provided disposed one each in separate apertures 53 through the matting. In this embodiment, all of the cells 80 combine to display but one image, e.g., one of the numerals 0-9, and each cell 80 is selectable to function either in the on or off mode. In the off mode, for example, the cells are light absorptive, hence appear dark, and in the on mode, the cells are reflective of light and appear bright. The dark cells have an appearance identical to that of the matting and thus, at least at a normal viewing distance from the display, blend invisibly into the matting background. Thus, in this example, only the on, bright cells are visible, thereby displaying a number.

By this arrangement, relatively small and inexpensive liquid crystal cells can be used to create a quite large display. The spacings between the various cells 80 are not critical, but are preferably as small as possible to give the appearance, at an expected viewing distance, of continuous element images. The viewing distance is a function of the size of the cells and the display and is a matter of design choice.

Figure 7:
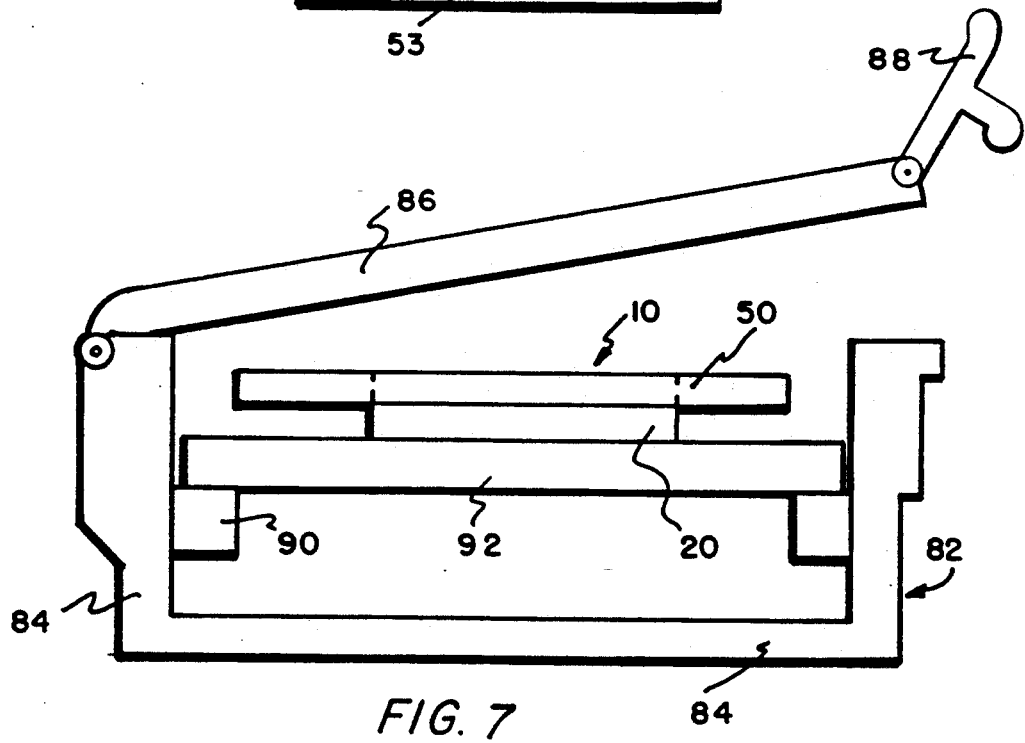
FIG. 7 is a plan view of a display apparatus comprising an hermetically sealable enclosure having a liquid crystal display device therein, the top side of the enclosure being removed.

FIG. 7 shows an example of a complete display apparatus including an hermetically sealable enclosure 82 containing a liquid crystal display device 10. The enclosure, e.g., of transparent plastic, comprises rigid sides 84 and a hinged cover 86 including a latch mechanism 88 for tightly and hermetically sealing the cover 86 to the enclosure sides. Suitable gaskets, not shown, are preferably provided at the areas of contact between the cover 86 and the sides 84.

A shelf 90 is provided within the enclosure for supporting a printed circuit board 92 on which is mounted a liquid crystal display device 10 of the type shown in FIG. 1. The device 10 comprises a liquid crystal cell 20 and a surrounding matting 50.

The circuit board includes various known electrical circuits (not shown) for driving the display. Also, a battery, not shown, can be included within the enclosure 82 for powering the display.

What is claimed is:

1. A display apparatus for underwater use comprising an hermetic enclosure having a transparent window in an outer wall thereof, and a liquid crystal device within said enclosure, said liquid crystal device comprising a matting and a liquid crystal cell separate from said matting and surrounded by said matting, said matting providing a visual background for said cell, said cell including a front surface to be viewed and a rear surface, a front light polarizer disposed in front of the front surface of said cell, a rear light polarizer disposed behind the rear surface of said cell, and a light reflector disposed behind said rear light polarizer and facing frontwards, said matting comprising a laminate including, from a front viewed surface thereof rearwardly, contiguous layers of identical ones of said front and rear polarizers and said light reflector, said cell being switchable between light reflective and light absorbing modes, one of said modes being used as a background of images to be displayed and visually corresponding substantially exactly to the visual background provided said matting, and said front viewable surfaces of said cell and said matting being viewable through said transparent window.

2. An apparatus according to claim 1, wherein said laminate has an aperature therein corresponding in shape and dimensions to that of said liquid crystal cell, said cell fitting within said aperture with a front surface of said front polarizer disposed substantially coplanar with the front surface of said laminate.

3. An apparatus according to claim 1 wherein said laminate has an aperture therein and said liquid crystal cell is mounted against a rear surface of said laminate and extending over said aperture for front viewing of the front surface of said cell through said aperture.

4. An apparatus according to claim 1 further including another liquid crystal cell, said cells being mounted on said matting, each of said cells being individually addressable to each display an image, and said matting providing a common background for each of said cells.

5. An apparatus according to claim 1 further including a plurality of liquid crystal cells, said cells being mounted on said matting in a preselected image defining relationship, each of said when selected, defining an element of an image to be displayed.

* * * * *